United States Patent
Kimura

[11] Patent Number: 6,105,077
[45] Date of Patent: Aug. 15, 2000

[54] TRANSMITTING SYSTEM WITH ADDRESS POLLING FOR PROVIDING A CONTROL SIGNAL TO OPEN/CLOSE SWITCH

[75] Inventor: Tetsuo Kimura, Tokyo, Japan

[73] Assignee: Nittan Company, Limited, Tokyo, Japan

[21] Appl. No.: 09/010,494

[22] Filed: Jan. 21, 1998

[30] Foreign Application Priority Data

Jan. 21, 1997 [JP] Japan ................................. 9-020929

[51] Int. Cl.[7] ............................. G06F 9/06; G08B 29/02
[52] U.S. Cl. ................................. 710/9; 710/10; 710/104; 710/131; 340/505; 340/506
[58] Field of Search ..................................... 340/506, 505, 340/825, 518, 146; 710/9, 104, 10, 131; 455/600; 714/4

[56] References Cited

U.S. PATENT DOCUMENTS

| 4,360,870 | 11/1982 | McVey | 710/9 |
|---|---|---|---|
| 4,438,434 | 3/1984 | Wason | 340/825.51 |
| 4,612,534 | 9/1986 | Buehler et al. | 340/505 |
| 4,730,251 | 3/1988 | Aakre et al. | 710/104 |
| 4,742,335 | 5/1988 | Vogt | 340/518 |
| 4,864,519 | 9/1989 | Appleby et al. | 364/550 |
| 5,168,273 | 12/1992 | Solomon | 340/870.05 |
| 5,226,123 | 7/1993 | Vockenhuber | 710/131 |
| 5,404,460 | 4/1995 | Thomsen et al. | 710/9 |
| 5,473,308 | 12/1995 | Imaizumi | 340/506 |
| 5,619,184 | 4/1997 | Torikoshi et al. | 340/506 |
| 5,715,475 | 2/1998 | Munson et al. | 710/10 |
| 5,862,405 | 1/1999 | Fukuda et al. | 395/829 |

*Primary Examiner*—Thomas C. Lee
*Assistant Examiner*—Katharina Schuster
*Attorney, Agent, or Firm*—Bacon & Thomas, PLLC

[57] ABSTRACT

A transmitting system including a controller for supervising an address polling system; and a plurality of transmitting modules; connected in cascade to a pair of transmitting paths extending from the controller, for executing polling transmissions from the controller by using a logical address set in each transmitting module; wherein the controller sends a command message for setting the logical address and each transmitting module includes: a switching element circuit for opening and closing between input and output terminals connected to the transmitting paths; and a signal processing circuit for setting the logical address to an address assigned by the command message when a polling address of the command message is identical to the logical address, and for providing a signal to the switching element circuit according to the logical address.

11 Claims, 9 Drawing Sheets

TRANSMITTING SYSTEM WITH ADDRESS POLLING FOR PROVIDING A CONTROL SIGNAL TO OPEN/CLOSE SWITCH

BACKGROUND OF THE INVENTION

The present invention relates to a transmitting system for a disaster avoiding system for performing communication by address polling, and more particularly to a transmitting system in which a logical address of a transmission module such as a sensor or the like may be automatically set.

In general, a transmitting system such as a disaster avoiding system for performing communication by address polling is provided with a controller for supervising in an address polling manner, and a plurality of transmitting modules such as sensors connected to transmitting paths extending from the controller for executing the polling transmitting by using logical addresses set in each transmission module.

In such a transmitting system, addresses are set in advance in the transmission modules such as sensors. Accordingly, the sensors whose addresses are set are installed, a single sensor whose predetermined address is set at a predetermined place shown in the equipment drawings must be selected from the sensor groups to be installed. Otherwise, the address setting means such as dip switches or the like must be set on the site. These are made a burden on working.

In order to decrease such work, a method for automatically assigning the addresses is disclosed by various companies (Japanese Patent Publication No. 78024/1991, Japanese Patent Publication No. 3906/1994 and Japanese Patent Publication No. 40319/1995).

In a first piece of prior art disclosed in Japanese Patent Publication No. 78024/1991, a switching element in which a predetermined delay time is set is provided in each sensor. Upon turning a power source on, the sensors are connected to the transmitting paths in order for every delay time. Accordingly, this delay time is utilized for setting the logical address.

In a second piece of prior art disclosed in Japanese Patent Publication No. 3906/1994, an address memory and a switching element inserted in series in a transmitting line for the next stage are provided in each sensor. When the address is not set in the address memory, the switching element is opened, and when the address is set, the switching element is closed and the address setting is prohibited.

Furthermore, a third piece of prior art disclosed in Japanese Patent Publication No. 40319/1995, when the address set in a first address setter provided in a sensor is identical with address data from a central processing controller, the address sent from the central processing controller is set in a second address setter, and the polling is effected for supervision onward on the basis of the address set in the second address.

However, in the first prior art, since the sensors or the like are connected in order in accordance with the predetermined delay time, when any communication trouble occurs, the central processing controller keeps on sending an address set message to the sensor or the like to which the address is to be set, so that the delay time set in its terminal is over. As a result, there are cases where the two or more sensors or the like in which the address is not set are connected on the transmitting path. Under such a condition, when the address setting message is received in a plurality of sensors in which the address is not set, the same address is allotted to the plurality of the sensors or the like.

Also, in the first prior art, when the power source is turned on, the delay circuit is operated. Even if the address has already been set, if the address is lost due to the delay time circuit, the address is again allotted in the same way. Also, it is necessary to simply wait for the polling until the delay circuits all work and the switches connected in series in the transmitting line works. The first prior art suffers such problems.

Furthermore, in the second prior art, since the address is simply set, when the sensors or the like connected in the same transmitting path are connected in parallel, there is a disadvantage that the same address is allotted to these sensors.

Also, in the third prior art, the different logical addresses are automatically set, it is necessary to confirm what type of logical addresses are allotted for the installed sensors.

SUMMARY OF THE INVENTION

Accordingly, an object of the present invention is to provide a transmitting system which may overcome the above-noted defects inherent in each of the prior art, may set a logical address without fail and furthermore, may cope with branches or the like of the transmitting path.

In order to attain the objects, according to a first aspect of the invention, there is provided a transmitting system including a controller that may execute the supervision in an address polling system and a plurality of transmitting modules connected in cascade to a pair of transmitting paths extending from the controller for executing the polling transmission by using a logical address set in each transmitting module, characterized in that said controller may send a command message for setting the address; and the transmitting module includes a switching element circuit for opening and closing between said input and output terminal connected to said transmitting paths, and a signal processing circuit for setting the predetermined non-set address to represent a fact that the logical address is not yet set or for setting logical address, and for controlling an opening/closing signal to said switching element circuit according to the setting condition of said non-set address.

In order to attain the objects, according to a second aspect of the invention, there is provided a transmitting system including a controller that may execute the supervision in an address polling manner and a plurality of transmitting modules connected in cascade to a pair of transmitting paths extending from the controller for executing the polling transmission by using a logical address set in each transmitting module, characterized in that said controller may send a command message for setting the address, the transmitting module comprises a switching element circuit having input and output terminals connected to the transmitting paths for opening and closing between said input and output terminals by an opening/closing control signal to be inputted and a signal processing circuit having an address setting means for giving an opening control signal to said switching element circuit when a predetermined non-set address shows a state that a logical address is not set in said address setting means, and giving a closing control signal to said switching element circuit when the logical address is set, and for setting the address to said address setting means by the command message for setting the address from said transmitting paths when the address by the address polling from the transmitting paths is identical with the set address set in said address setting means.

Accordingly, in accordance with the first and second aspects of the present invention, it is possible to automatically allot the addresses to the transmitting modules such as sensors or the like connected in cascade to the pair of transmitting paths, it is possible to immediately specify the transmitting module in which the logical address is not set, and it is possible to immediately judge whether or not the transmitting module in which the logical address is not set is present.

According to a third aspect of the invention, there is provided a transmitting system including a controller that may execute the supervision in an address polling manner and a plurality of transmitting modules connected in cascade to a pair of transmitting paths extending from the controller for executing the polling transmission by using a logical address set in each transmitting module, characterized in that said controller may send a command message for setting the address, the transmitting module comprises a switching element circuit having input and output terminals connected to the transmitting paths for opening and closing between said input and output terminals by an opening/closing control signal to be inputted, and a signal processing circuit having an address setting means for giving an opening control signal to said switching element circuit when a predetermined non-set address representing a state that a logical address is not set in said address setting means, and giving a closing control signal to said switching element circuit when the logical address is set, and for setting the address to said address setting means by the command message for setting the address from said transmitting paths when the address by the address polling from the transmitting paths is identical with the set address set in said address setting means, and said pair of transmitting paths are branched from any desired portion, a plurality of transmitting modules are connected in cascade to each pair of the branched transmitting paths, and a different kind of a predetermined non-set address is set for every branched transmitting path in at least each pair of transmitting modules connected immediately after the branch point of each transmitting path so that a logical address is set in order for every different predetermined non-set address.

Accordingly, according to the third aspect of the present invention, it is possible to set a plurality of different non-set addresses to the transmitting module, and the logical addresses can be suitably set to the plurality of transmitting modules belonging to the respective branches even the transmitting path branches out.

According to the signal processing circuit, even if the logical address is set in said address setting means, said signal processing circuit may give the opening/closing control signal to said switching element circuit by the command message from the transmitting paths.

Accordingly, according to the signal processing circuit, since it is possible to open and close the switching element circuit after the logical address setting, even if the transmitting path is branched out, it is possible to set the logical address in the plurality of transmitting modules belonging to any branch without fail.

Further, each of said transmitting modules includes a display means for lighting in a predetermined condition, and a signal processing circuit for lighting said display means on the basis of the opening control signal given from said signal processing circuit to said switching element circuit.

Accordingly, according to this transmitting module, it is possible to immediately judge, from the outside of the transmitting module, whether or not the logical address is set by viewing the display means.

Further, said signal processing circuit may include an address setting means for writing the non-set address or the logical address, and an address detecting means for detecting whether or not the non-set address is set in said address setting means, giving the opening control signal to said switching element circuit when the non-set address is set and for outputting the closing control signal to said switching element circuit when the logical address is set.

Accordingly, according to this signal processing circuit, it is possible to set the logical address without fail.

DESCRIPTION OF THE PREFERRED EMBODIMENTS

An embodiment of the present invention will now be described with reference to the accompanied drawings.

First Embodiment

Figure 1:
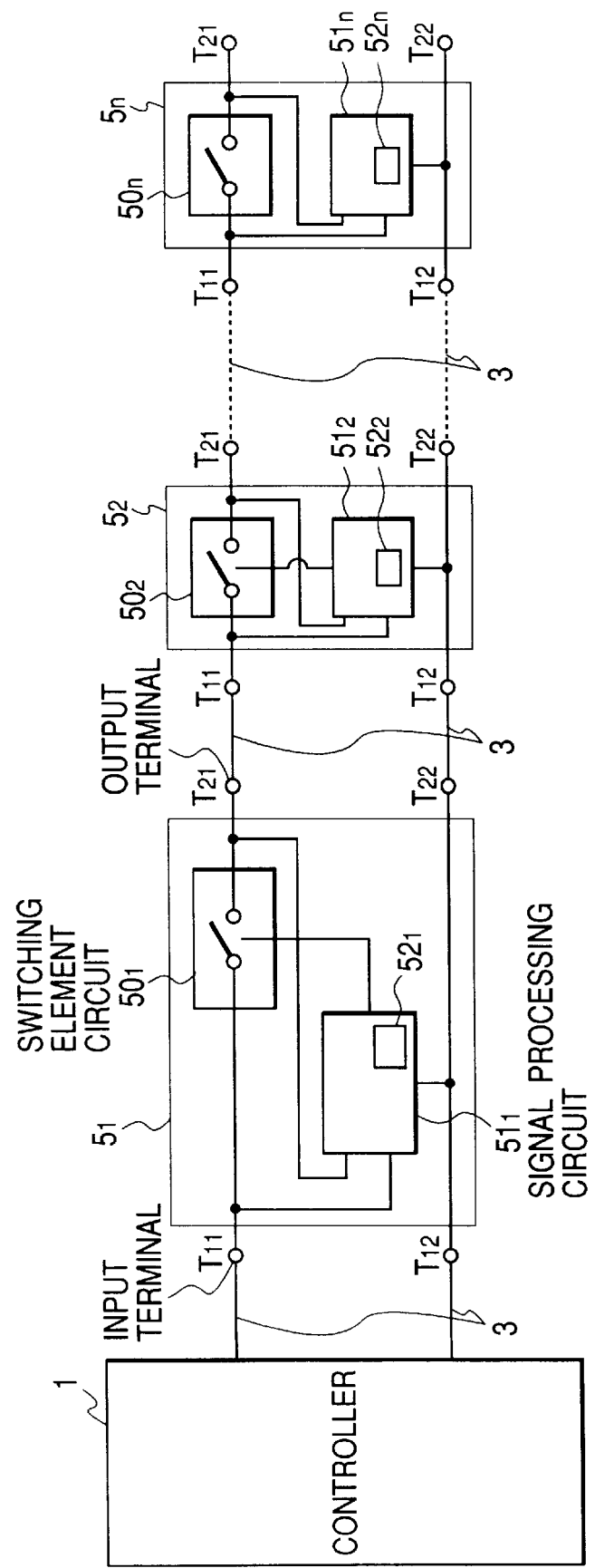
FIG. 1 is a block diagram showing a transmitting system in accordance with a first embodiment of the invention.

FIG. 1 is a block diagram showing a transmitting system according to the embodiment of the invention. In FIG. 1, reference numeral 1 denotes a central processing controller. The central processing controller 1 performs a supervision function by address polling using an address setting command message or the like for setting the address. A plurality of transmitting modules $5_1$, $5_2$, . . . , $5_n$ (where n is any desired number) are connected in cascade to a pair of power and communication lines 3 which are transmitting paths extending from the controller 1.

Since each of the transmitting modules $5_1$, $5_2$, . . . , $5_n$ is connected to the same circuit by the same structural components, the explanation will now be given only to the structure of the transmitting module $5_1$ and the explanation for the transmitting modules $5_2$, $5_3$, . . . , $5_n$ will be omitted.

When it is necessary to explain the structural component, such will be explained with the same reference being suffixed to the reference numeral of the structural component.

The transmitting module $5_1$ has input terminals $T_{11}$ and $T_{12}$ and output terminals $T_{21}$ and $T_{22}$ connected to the pair of power and communication lines 3. Also, the transmitting module $5_1$ is provided with a switching element circuit $50_1$ for opening and closing the line between the input terminal $T_{11}$ and output $T_{21}$ by the opening/closing control signals $S_{CTLO}$ and $S_{CTLC}$ to be inputted, and a signal processing circuit $51_1$ having an address setting means $52_1$ in which non-set address is set in advance for imparting the opening control signal $S_{CTLO}$ to the switching element circuit $50_1$ when non-set address is set in the address setting means $52_1$, and for imparting the closing control signal $S_{STLC}$ to the switching element circuit $50_1$ by setting the logical address included in the command message to the address setting means $52_1$ when the polling address of the address setting command message from the power and communication lines 3 is identical with the non-set address set in the address setting means $52_1$.

Figure 2:
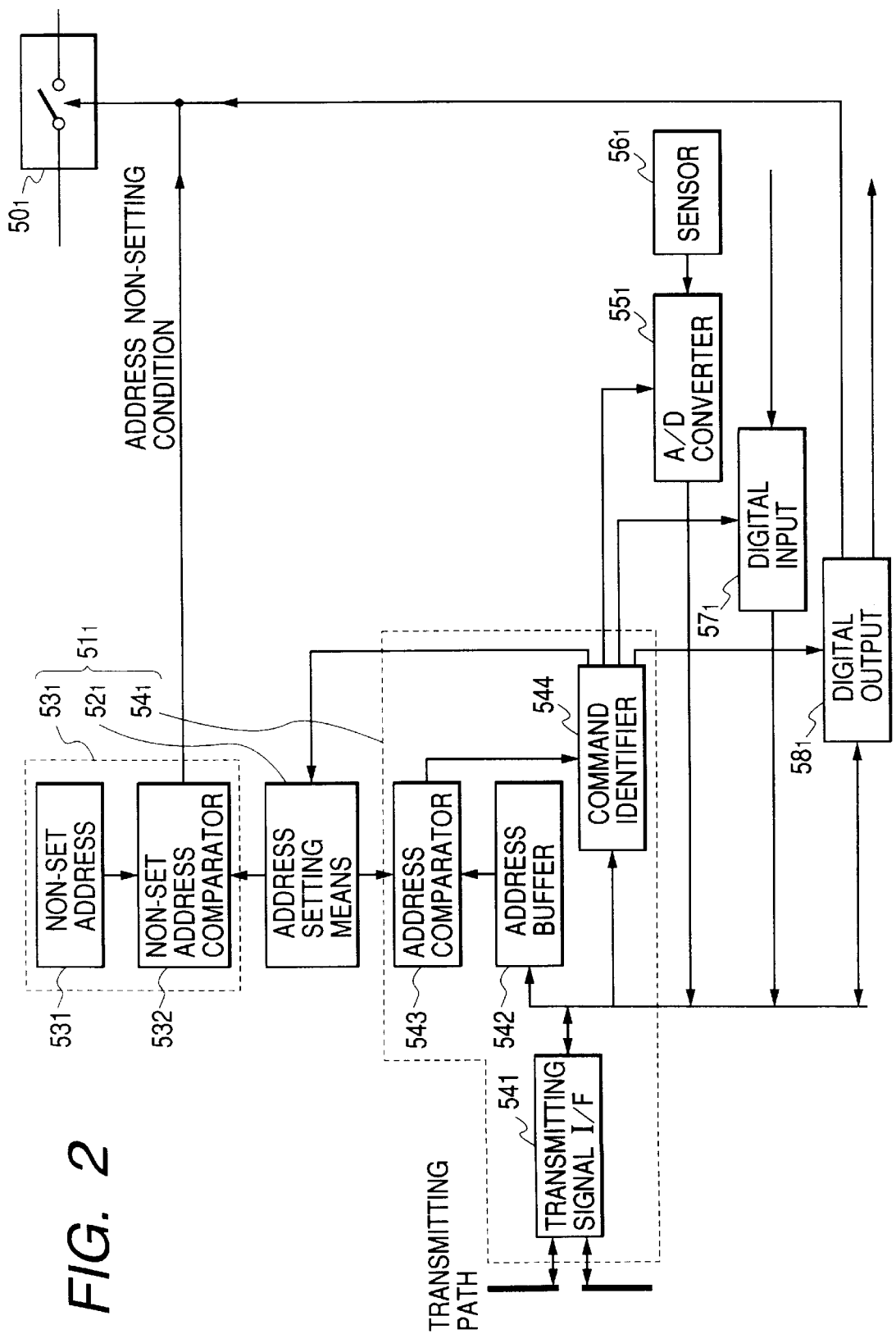
FIG. 2 is a block diagram showing a detail of a structural example of a signal processing circuit used in the first embodiment.

FIG. 2 is a block diagram showing a detailed structure example of the above-described signal processing circuit. In FIG. 2, the above-described signal processing circuit $51_1$ is provided with an address setting means $52_1$ in which a non-set address is set in advance and a logical address may be written over the non-set address. An address detecting means $53_1$ is provided for detecting whether or not a non-set address is set in the above-described address setting means $52_1$. The address detecting means $53_1$ outputs an opening control signal $S_{STLO}$ to the switching element circuit $50_1$ when the non-set address is set, and a closing control signal $S_{STLC}$ to the switching element circuit $50_1$ when the logical address other than the non-set address is set, logical address processing means $54_1$ is also provided for setting the logical address assigned by the command message to the address setting means $52_1$ when the polling address of the address setting command message is identical to the non-set address set in the address setting means $52_1$.

Explaining in more detail, the address detecting means $53_1$ is composed of a non-set address memory $531_1$ and a non-set address comparator $532_1$ for comparing the non-set address set in the non-set address memory $531_1$ with the address set in the above-described address setting means $52_1$, outputting an identity signal from the comparator $532_1$ when the non-set address is set in the above-described address setting means $52_1$ (outputting the opening control signal $S_{CTLO}$ to the switching element circuit $50_1$) and outputting a non-identity signal from the comparator $532_1$ when the logical address other than the non-set address is set in the above-described address setting means $52_1$ (outputting the closing control signal $S_{CTLC}$ to the switching element circuit $50_1$).

Also, the logical address processing means $54_1$ is composed of a transmitting signal interface circuit $541_1$ for receiving an electric supply and a signal from an input side and an output side of the power and communication lines 3, an address buffer circuit $542_1$ for temporarily storing address information fed from the central processing controller 1 on the power and communication lines 3 through the transmitting signal interface circuit $541_1$, an address comparator $543_1$ for comparing the address of the address buffer circuit $542_1$ with the address set in the above-described address setting means $52_1$ and picking up the identity signal, and a command identifier $544_1$ for identifying the command information obtained from the above described transmitting signal interface circuit $541_1$ and executing processes such as switching element circuit opening/closing control, address setting, analog collection, digital input collection, digital output setting and the like in response to the command.

Incidentally, the transmitting module $5_1$ is further provided with an A/D convertor $55_1$, a sensor $56_1$, a digital input circuit $57_1$ and a digital output circuit $58_1$. When the convert signal is given from the command identifier $544_1$ to the A/D convertor $55_1$, the A/D converter $55_1$ converts the analog detecting signal detected in the above-described sensor $56_1$ into the digital signal and output it to the side of the central processing controller 1. The above-described digital input circuit $57_1$ receives classified information set on the transmitting module side by the processing command from the command identifier $544_1$ or the digital value as in the condition of a conventional sensor or a conventional transmitter for inputting information to the central processing controller 1. The digital output circuit $58_1$ outputs on the transmitting module side the digital output values such as opening/closing control of the switching element circuit, display lamp lighting, function test control and the like as the demand from the central processing controller 1 by the processing command from the command identifier $544_1$.

Since the above-described address setting means $52_1$ need to be rewritable, it is possible to realize it by a random access memory (RAM). However, once the power is turned off, it is necessary to set again the logical address. Accordingly, it is preferable to realize the address setting means by a RAM which does not need the resetting of the logical address and in which the power is backed up, or a writable non-volatile memory such as an EEPROM (Electrically Erasable Programmable Read-Only Memory) whose content may be erased or rewritten.

Figure 3:
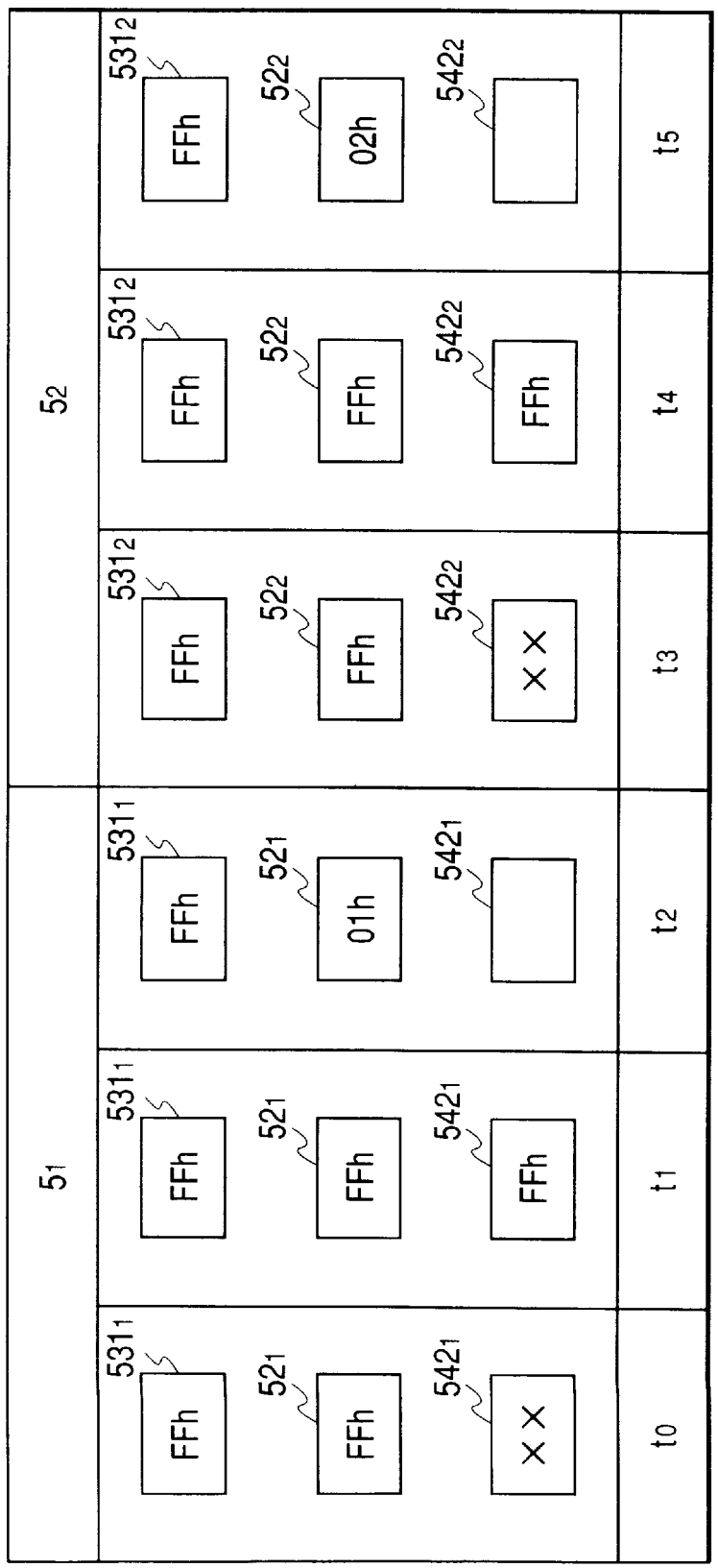
FIG. 3 is an illustration of the operation of the first embodiment.
Figure 4:
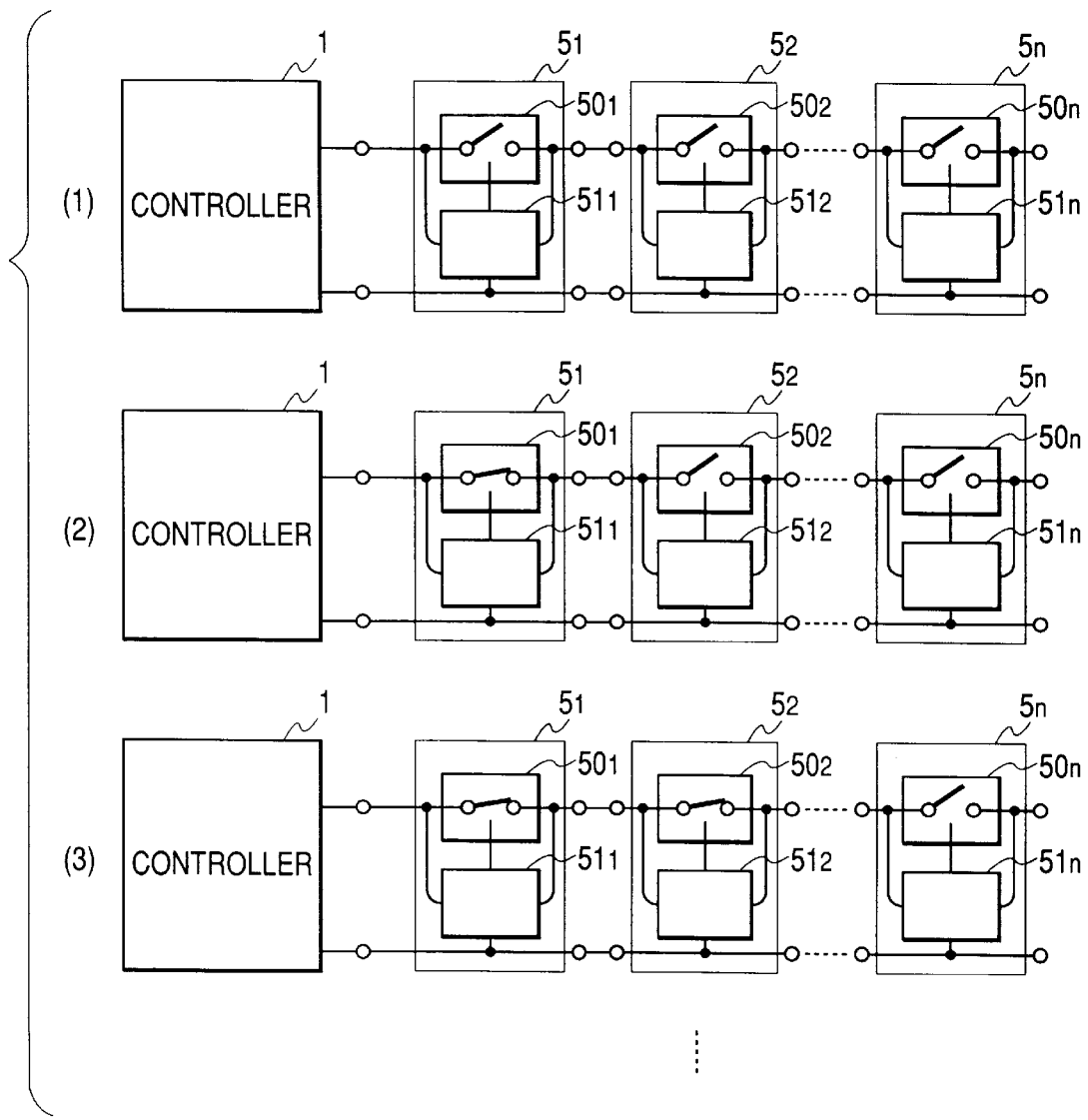
FIG. 4 is illustrational view showing the connected states of each transmitting module in accordance with the first embodiment in which (1) represents the state that switching element circuits $50_1$ to $50_n$ of the transmitting modules $5_1$ to $5_n$ are all opened, (2) represents the state that switching element circuit $50_1$ of the transmitting modules $5_1$ is closed, and (3) represents the state that switching element circuit $50_2$ of the transmitting modules $5_2$ is closed.

The operation of the thus far described first embodiment will now be explained with reference to FIGS. 3 and 4 on the basis of FIGS. 1 and 2. FIG. 3 is a view showing a change in the stored data in the address buffer circuit and the address setting means in the first embodiment. FIG. 4 is a view illustrat-ing connected conditions of each transmitting module.

In the first embodiment, each of the above-described transmitting modules $5_1, 5_2, \ldots, 5_n$ executes the following process in response to the command message sent from and fed out of the central processing controller 1.

The command message fed out of the central processing controller 1 to the power and communication lines 3 includes an address setting command message for executing the address setting. The command message sets any desired logical address to each of the transmitting modules $5_1, 5_2, \ldots, 5_n$. More specifically, the command message is executed as follows. Namely, the central processing controller 1 feeds the address currently set (non-set address) to the transmitting module. The transmitting module returns a response signal back to the controller 1 when the address is identified with the address set in itself. Then, the controller 1 feeds continuously the logical address desired to be set and the address setting command in order to set the address.

Setting Operation of Logical Address of Transmitting Module $5_1$

First of all, in the initial condition, since the switching element circuit $50_1$ of the transmitting module $5_1$ is in the opened condition, only the transmitting module $5_1$ is in the connected condition to the central processing controller 1.

The reason that the condition is such is as follows. Namely, an electric power is supplied through the power and communication lines 3 from the central processing controller 1 to the transmitting module $5_1$. In the address setting means $52_1$ and the non-set address memory $531_1$ of the transmitting module $5_1$, the non-set address (for example, FFh where the h means 16 notation) is set (at the time to in FIG. 3, entry xx is made to show no value is yet determined in the address buffer circuit $54_2$ and the same applies hereafter). Accordingly, the identity signal is outputted from the non-set address comparator $532_1$, and the opening control signal $S_{CTLO}$ is fed to the switching element circuit $50_1$, so that the switching element circuit $50_1$ is opened, and the electric power is not supplied to the following transmitting modules $5_2$, $5_3$, . . . , $5_n$. The condition of the switching element circuit of the transmitting module to which the electric power is not supplied depends upon the original design. However, for the convenience of explanation, it is assumed that such a switching element circuit is opened, the switching element circuits $50_1$, $50_2$, . . . , $50_n$ of the transmitting modules $5_1$, $5_2$, . . . , $5_n$ are all opened condition (see FIG. 4(1)).

In other words, under the condition that the logical address is not allotted, only the transmitting module $5_1$ in which the switching element circuit $50_1$ is opened is connected to the central processing controller 1, and the transmitting modules $5_2$, $5_3$, . . . , $5_n$ which are connected thereafter and in which the addresses are not set will never respond. Accordingly, it is possible to immediately perform the communication by specifying only the transmitting module $5_1$ from central processing controller 1.

Subsequently, when the above-described command message is fed from the above-described central processing controller 1 through the power and communication lines 3 to the transmitting module $5_1$, its address (FFh) is set in the address buffer circuit $542_1$ (time $t_1$ of FIG. 3).

Then, the address (FFh) set in the address buffer circuit $542_1$ and the non-set address (FFh) set in advance in the address setting means $52_1$ are compared with each other in the address comparator $543_1$. In this case, since the same address (FFh) is set in the address setting means $52_1$ and the address buffer circuit $542_1$ (see time $t_1$ of FIG. 3), the address comparator $543_1$ feeds an identity signal to the command identifier $544_1$ and returns a response signal to the central processing controller 1.

Thus, the command identifier $544_1$ becomes active and identifies the command subsequently sent to thereby recognize the address setting command information. Then, the command identifier $544_1$ recognizes that the data to be fed subsequently is the logical address and resets the data to be sent, to the address setting means $52_1$ as the logical address (time $t_2$ of FIG. 3).

On the other hand, when the non-set address (FFh) in the initial condition is set in the address setting means $52_1$, since the non-set address (FFh) is set in the non-set address memory $53_1$ (times to and $t_1$ of FIG. 3), the non-set address condition signal (opening control signal $S_{STLO}$) is outputted from the non-set address comparator $532_1$. In accordance with the opening control signal $S_{STLO}$, the switching element circuit $50_1$ is driven at the opened condition. Accordingly, as described above, with respect to one of the power and communication lines 3 on the loop on the side of the central processing controller 1 (the other of the lines is not connected in this case), since the input and output circuits of the power and communication lines 3 are opened at the transmitting module $5_1$, there is provided only one transmitting module $5_1$ having the non-set address. Accordingly, there is no possibility that the same logical address is set to a plurality of transmitting modules in a duplicated manner.

Then, when the transmitting module $5_1$ of the non-set address is set (time $t_2$ of FIG. 3) in the address other than the non-set address (logical address, e.g. 01h) in the address setting mean $52_1$, the address non-set condition signal from the non-set address comparator $532_1$ is not present, and the closing control signal $S_{CTLC}$ is fed to the switching element circuit $50_1$ so that the switching element circuit $50_1$ is closed to supply the power supply and transmitting signal to the transmitting module $5_2$ connected ahead of the transmitting module $5_1$ (see FIG. 4(2)).

Logical Address Setting Operation of Transmitting Module $5_2$

Also, since the non-set address is set in the switching element circuit $50_2$ of the transmitting module $5_2$, the circuit is opened. Accordingly, the transmitting modules $5_1$ and $5_2$ are connected to the central processing controller 1 (see FIG. 4(2)).

Under such condition (time $t_3$ of FIG. 3, and FIG. 4(2)), the non-set address (e.g., FFh) is set in the non-set address memory $531_2$ and the address setting means $52_2$ of the transmitting module $5_2$. For this reason, at this time (time $t_3$ of FIG. 3), the identity signal is outputted from the comparator $532_2$ and the opening control signal $S_{CTLO}$ is fed to the switching element circuit $50_2$. The switching circuit $50_2$ is opened. Accordingly, the electric power is not fed to the modules after the transmitting module $5_3$. Namely, the switching element circuits $50_2$, $50_3$, . . . , $50_n$ of the transmitting modules $5_2$, $5_3$, . . . , $5_n$ are all opened (see FIG. 4(2)).

If the address setting command message making the non-set address (e.g., FFh) the polling address is outputted from the central processing controller 1.

Then, the said command message fed from the controller 1 is fed to the transmitting modules $5_1$ and $5_2$.

Concerning the operation in this case, the operation on the transmitting module $5_1$ side will first be explained and then the operation on the transmitting module $5_2$ side will be explained.

In the above-described transmitting module $5_1$, even if the non-set address (for example, FFh) is temporarily stored in the address buffer circuit $542_1$, since the logical address (01h) has already been set in the address setting means $52_1$, the non-identity signal is outputted from the address comparator $543_1$. Accordingly, the command identifier $544_1$ is not active, does not return the response signal, and does not received a signal from the transmitting signal interface circuit $541_1$.

The above-described transmitting module $5_2$ can be explained as follows. Namely, when the above-described command message is fed from the above-described central processing controller 1 through the power and communication lines 3 to the transmitting module $5_2$, the polling address (for example, FFh) that is its non-set address is set in the address buffer circuit $542_2$ (time $t_4$ of FIG. 3).

Then, the address (FFh) set in the address buffer circuit $542_2$ and the non-set address (FFh) set in advance in the address setting means $52_2$ are compared with each other by the address comparator $543_2$. In this case, since the same address (FFh) is set in the address setting means $52_2$ and the address buffer circuit $542_2$ (time $t_4$ of FIG. 3), the address comparator $543_2$ feeds the identical signal thereto to the command identifier $544_2$ and returns a response signal to the central processing controller 1.

Thus, the command identifier $544_2$ is active and identifies the command sent next and recognize to be the address setting command information. Then, the command identifier $544_2$ recognizes the data fed next to be the logical address desired to be set then the data sent next (02h), is reset as the logical address (time $t_5$ of FIG. 3) to the address setting means $52_2$.

On the other hand, when the non-set address in the initial condition is set in the address setting means $52_2$ (time $t_4$ of FIG. 3), the non-set address condition signal (opening control signal $S_{STLO}$) is outputted from the non-set address comparator $532_2$. By the opening control signal $S_{STLO}$, the switching element circuit $50_2$ is driven to be opened. Accordingly, as described above, with respect to one of the power and communication lines 3 on the loop on the side of the central processing controller 1 (the other of which is not connected in this case), since the input and output circuits of the power and communication lines 3 are opened at the transmitting module $5_2$, there is provided only one transmitting module $5_2$ having the non-set address. Accordingly, in synergetic effect with the operation of the above-described module $5_1$, there is no possibility that the same logical address is set to a plurality of transmitting modules in a duplicated manner.

Then, when the transmitting module $5_2$ of the non-set address is set (time $t_5$ of FIG. 3) in the address other than the non-set address (logical address (02h)) in the address setting means $52_2$, the address non-set condition signal from the non-set address comparator (open control signal $S_{CTLO}$) is not present, and the closing control signal $S_{CTLC}$ is outputted to close the switching element circuit $50_2$ (see FIG. 4(3)), thereby power and transmitting signal is supplied to the transmitting module $5_3$ connected to the next of the transmitting module $5_2$.

The operation thereafter is in setting operation for the logical address of the transmitting module $5_3$. Accordingly, as described above, the respective transmitting modules $5_3$, $5_4$, ..., $5_n$ are operated to thereby set the logical addresses to the transmitting modules $5_3$, $5_4$, ..., $5_n$ one after another.

Finally, when no transmitting module in which the non-set address is set is in the power and communication lines 3, even if the address setting command message is newly fed from the central processing controller, the non-set address that is the polling address is not present in the power and communication lines 3. Accordingly, there is no response signal. The central processing controller 1 confirms that the steps of logical address setting have been completed. Thereafter, it enters the normal supervision condition. Needless to say, since there is a possibility of the non-response condition caused by the transmitting error, it is preferable that the confirmation is conducted by plural times for recognition of the completion of the steps.

Incidentally, in the above-described first embodiment, the logical addresses are allotted in the order of connection. It is however possible to allot the logical addresses at random. This is because the logical addresses to be allotted are fed from the central processing controller 1 in the order of connection. If the logical addresses to be outputted from the central processing controller 1 are outputted at random, the logical addresses are set at random in the transmitting modules $5_1$, $5_2$, ..., $5_n$. However, it is generally practiced that logical addresses are allotted in the order in use. However, when the additional transmitting module is connected in the midway, it is not necessary to consider the order among the addresses of the transmitting modules after and before the additional module.

As described above, according to the first embodiment, the following advantages are available.

(A) It is possible to automatically allot the logical addresses to the plurality of transmitting modules $5_1$, $5_2$, ..., $5_n$.

(B) Since the address detecting means 53 is provided for controlling the opening/closing of the switching element circuit 50, it is possible to immediately specify the transmitting modules $5_1$, $5_2$, ..., $5_n$ in which the logical address is not set.

(C) The non-set address is fed from the central processing controller and it is judged whether or not there is the module in response to the non-set address, so that it is possible to immediately recognize whether there is provided the transmitting modules $5_1$, $5_2$, ..., $5_n$ in which the logical address is not set.

Second Embodiment

Figure 5:
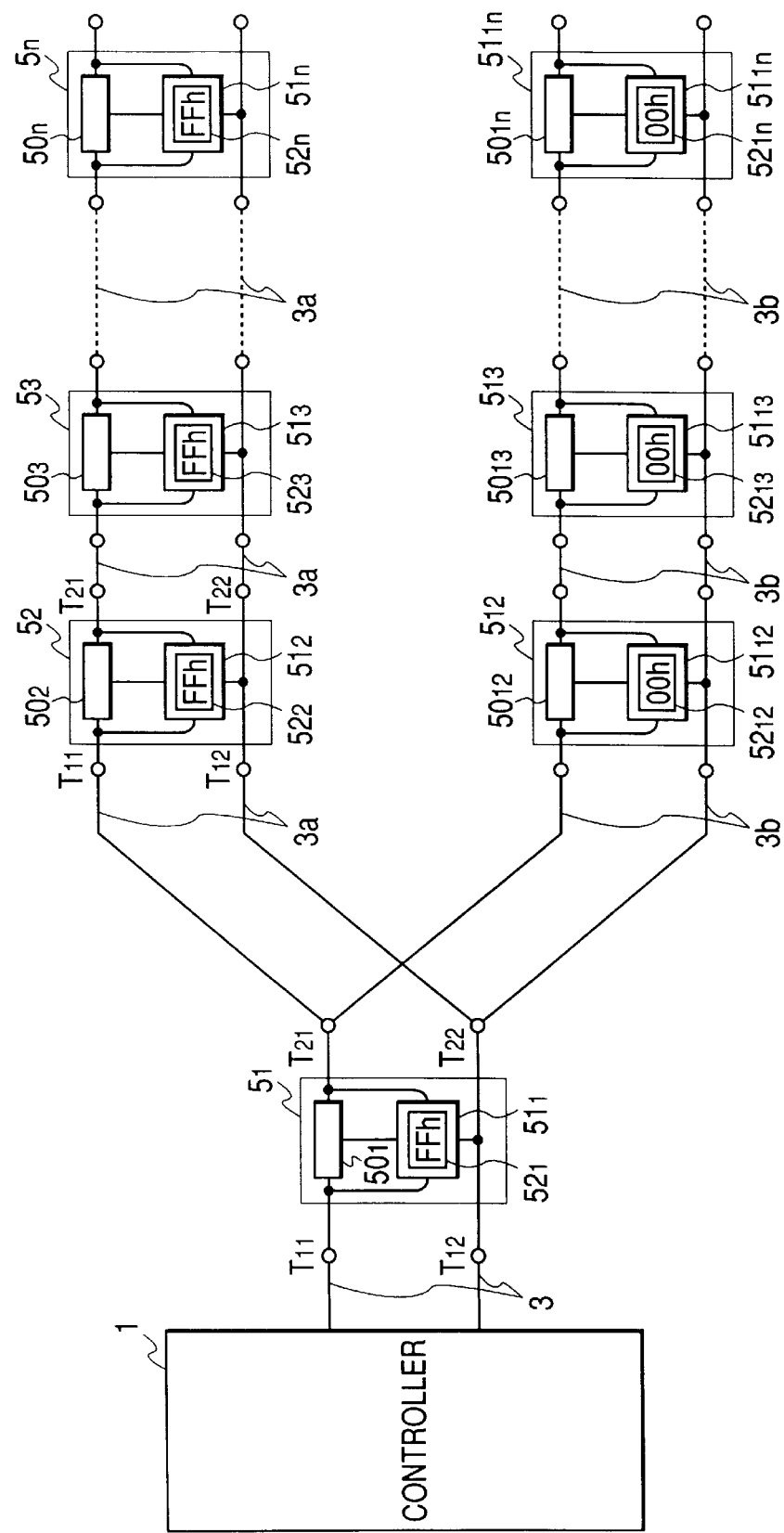
FIG. 5 is a block diagram showing a second embodiment of the invention.

FIG. 5 is a block diagram showing a second embodiment of the present invention. FIG. 5 shows the initial condition, i.e., the condition where the logical address is not set in the transmitting modules $5_1$, $5_2$, ..., $5_n$ and $5_{12}$, $5_{13}$, ..., $5_{1n}$ and only the transmitting module $5_1$ is electrically connected to the central processing controller 1. Input terminals $T_{11}$ and $T_{12}$ of the transmitting module $5_1$ are connected through a pair of power and communication lines 3 to the central processing controller 1. The input terminals $T_{11}$ and $T_{12}$ of the transmitting module $5_2$ and input terminals $T_{11}$ and $T_{12}$ of the transmitting module $5_{12}$ are connected in parallel to output terminals $T_{21}$ and $T_{22}$ of the transmitting module $5_1$. Furthermore, transmitting modules $5_3$, $5_4$, ..., $5_n$ are connected in cascade to those after the output terminals $T_{21}$ and $T_{22}$ of the transmitting module $5_2$ through pair of power and communication lines $3a$. In the same manner, transmitting modules $5_{13}$, $5_{14}$, ..., $5_{1n}$ are connected in cascade to output terminals after the output terminals $T_{21}$ and $T_{22}$ of the transmitting module $5_{12}$ through pairs of power and communication lines $3b$.

Also, it is assumed that [FFh], for example, is set as the non-set address in advance in the transmitting modules $5_1$, $5_2$, ..., $5_n$. Also, it is assumed that [00h], for example, that is different from the above-described non-set address is set in advance in the transmitting modules $5_{12}$, $5_{13}$, ..., $5_{1n}$.

Namely, the input terminals $T_{11}$ and $T_{12}$ of the transmitting module $5_1$ are connected to the pair of power and communication lines 3 extending from the central processing controller 1. The pair of power and communication lines 3 are branched from, for example, the output terminals $T_{21}$ and $T_{22}$ of the transmitting module $5_1$. A plurality of transmitting modules $5_2$, $5_3$, ..., $5_n$ and $5_{12}$, $5_{13}$, ..., $5_{1n}$ are connected in cascade to the pair of power and communication lines $3a$ and the pair of power and communication lines $3b$ respectively. Also, different non-set addresses [FFh, 00h] are set for each power and communication lines $3a$, $3b$ in the plurality of transmitting modules $5_2$, $5_3$, ..., $5_n$ and the plurality of transmitting modules $5_{12}$, $5_{13}$, ..., $5_{1n}$. The logical addresses are set in order in the transmitting modules $5_2$, $5_3$, ..., $5_n$ and transmitting modules $5_{12}$, $5_{13}$, ..., $5_{1n}$ for every non-set address [FFh or 00h].

First of all, the central processing controller 1 performs the setting operation of the logical address by sending out the address setting command message with the polling address [FFh]. Then, the transmitting module $5_1$ operates in the same manner as in the first embodiment. The logical address (for example, 01h) is set by the address [FFh]. Thus, the transmitting modules $5_1$, $5_2$, and $5_{12}$ are connected to the central processing controller 1.

Subsequently, the central processing controller 1 again sets the logical address by sending the address [FFh]. In this case, the power is supplies and communication is effected to the transmitting modules $5_1$, $5_2$, and $5_{12}$ through the power and communication lines 3. Accordingly, in the following description, the operation of the transmitting module $5_1$ will be first described, the operation of the transmitting module $5_2$ will then be described, and the operation of the transmitting module $5_{12}$ will finally be described.

First of all, as described in the above-described first embodiment, with respect to the transmitting module $5_1$, since the logical address [01h] has already been set in the address setting means $52_1$, the identical signal is not outputted from the address comparator $543_1$ and since the command identifier $544_1$ is non-active, the command message process using the non-set address [FFh] as the polling address is not executed.

Subsequently, with respect to the transmitting module $5_2$, the non-set address [FFh] is set in advance in the address setting means $52_2$ of the transmitting module $5_2$. Accordingly, when the polling address [FFh] from the central processing controller 1 is set in the address buffer circuit $542_2$, the identical signal from the address comparator $543_2$ is fed to the command identifier $544_2$. Thus, the command identifier $544_2$ is made active, and thereafter it operates in the same manner as in the first embodiment so that the logical address (for example, 02h) is set in the address setting means $52_2$.

Furthermore, with respect to the transmitting module $5_{12}$, the non-set address [00h] is set in the address setting means $52_{12}$ of the transmitting module $5_{12}$. Accordingly, when the polling address [FFh] from the central processing controller 1 is set in the address buffer circuit $542_{12}$, the non-identical signal from the address comparator $543_{12}$ is fed to the command identifier $544_{12}$. Thus, the command identifier $544_2$ is made non-active, and thereafter the command message from the central processing controller 1 is not received. Accordingly, the switching element circuits $50_{12}$, $50_{13}$, . . . , $50_{1n}$ of the transmitting modules $5_{12}$, $5_{13}$, . . . , $50_{1n}$ are opened and there is no possibility that the logical address is set by the address [FFh] from the central processing controller 1.

Subsequently, the central processing controller 1 again sets the logical address by sending the address [FFh]. In this case, the power is supplied and communication is effected to the transmitting modules $5_1$, $5_2$, $5_3$ and $5_{12}$ through the power and communication lines 3. Accordingly, in the following description, the operation of the transmitting module $5_1$ will be first described, the operation of the transmitting module $5_2$ will be described next, the operation of the transmitting module $5_3$ will be described and the operation of the transmitting module $5_{12}$ will be finally described.

First of all, as described in the above-described first embodiment, with respect to the transmitting module $5_1$, since the logical address [01h] has already been set in the address setting means $52_1$, the identical signal is not outputted from the address comparator $543_1$ and the command identifier $544_1$ is made non-active. Accordingly, the command message process using the non-set address [FFh] as the polling address is not executed.

Subsequently, with respect to the transmitting module $5_2$, the logical address [02h] has already been set in the address setting means $52_2$. Accordingly, the identical signal from the address comparator $543_2$ is not outputted. Thus, the command identifier $544_2$ is made non-active. Accordingly, the command message process using the non-active address [FFh] as the polling address is not performed.

Furthermore, with respect to the transmitting module $5_3$, the non-set address [FFh] is set in advance in the address setting means $52_3$ of the transmitting module $5_3$. Accordingly, when the polling address [FFh] from the central processing controller 1 is set in the address buffer circuit $542_3$, the identical signal from the address comparator $543_3$ is fed to the command identifier $544_3$. Thus, the command identifier $544_3$ is made active, and thereafter it operates in the same manner as in the first embodiment so that the logical address (for example, 03h) is set in the address setting means $52_3$.

Furthermore, with respect to the transmitting module $5_{12}$, the non-set address [00h] is set in the address setting means $52_{12}$ of the transmitting module $5_{12}$. Accordingly, even when the address [FFh] from the central processing controller 1 is set in the address buffer circuit $542_{12}$, the identical signal from the address comparator $543_{12}$ is not fed to the command identifier $544_{12}$. Thus, the command identifier $544_2$ is made non-active, and thereafter the command message from the central processing controller 1 is not received. Accordingly, the switching element circuits $50_{12}$, $50_{13}$, . . . , $50_{1n}$ of the transmitting modules $5_{12}$, $5_{13}$, . . . , $50_{1n}$ are opened and there is no possibility that the logical address is set by the address [FFh] from the central processing controller 1.

Thus, by the fact that there is no longer the transmitting module in response to the command message using the non-set address [FFh] as the polling address in the central processing controller 1 after the logical addresses [02h, 03h, . . . , 0nh] are set respectively to the transmitting modules $5_2$, $5_3$, . . . , $5_n$ connected in cascade to the power and communication lines 3a, it is confirmed that the address setting of the transmitting module using the non-set address as [FFh] has been completed. Then, the address [00h] is outputted to perform the setting of the logical address.

Here, if the central processing controller 1 outputs the address [00h], since the logical addresses have already been set in the above-described transmitting modules $5_1$, $5_2$, . . . , $5_n$, the transmitting modules operate as described above to bring the command identifiers $544_1$, $544_2$, . . . , $544n$ into the non-active condition not responding to the address [00h] fed out of the central processing controller 1.

In contrast thereto, the transmitting module $5_{12}$ operates in the same manner as in the first embodiment, and the logical address (for example, 12h) is set in the transmitting module $5_{12}$ by the address [00h]. Thereafter, the logical addresses [13h, 14h, . . . , 1nh] are set in the transmitting modules $5_{13}$, $5_{14}$, . . . , $5_{1n}$ connected in cascade to the power supply and communication lines 3b.

Thus, according to the manner of the second embodiment, the non-set address of the transmitting modules $5_1$, $5_2$, . . . , $5_n$ is made, for example, FFh, the non-set address of the transmitting modules $5_{12}$, $5_{13}$, . . . , $5_{1n}$ is made, for example, 00h these being different values respectively. And, it is possible to automatically set the logical addresses even with the power and communication lines 3a, 3b branched from each other.

Incidentally, in the foregoing description, the pair of power and communication lines 3 are branched from the transmitting module $5_1$. However, it is possible to set the logical address in the same steps even if the power and communication lines 3 are branched from any transmitting module.

Figure 6:
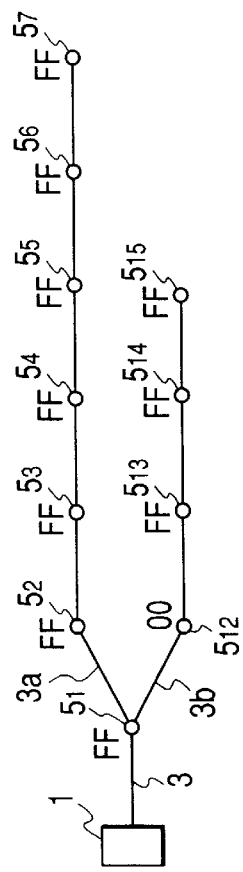
FIG. 6 is a block diagram showing a third embodiment of the invention.

FIG. 6 is a view illustrating another operation in accordance with the second embodiment and the structure of the third embodiment that follows. It is assumed that the transmitting modules $5_1, 5_2, \ldots, 5_n, 5_{12}, \ldots, 5_{1n}$ are connected to the central processing controller 1, and for example [FFh] is set in advance as the non-set address in each of the transmitting modules $5_1, 5_2, \ldots, 5_n, 5_{13}, \ldots, 5_{1n}$. For example, it is also assumed that [00h] which is different from the above-described non-set address is set in advance as the non-set address only in the transmitting module $5_{12}$ immediately after the branch position in the branched power and communication lines $3b$.

In such a condition, according to the second embodiment, the central processing controller 1 feeds out the address setting command message with the polling address [00h] for every transmitting module after the central processing controller 1 has first been connected to the transmitting module $5_1$ and inspects whether or not the branched transmitting module of the non-set address is connected. In this embodiment, since the transmitting module $5_{12}$ in which the polling address [00h] is set is present, a predetermined logical address is set in the transmitting module $5_{12}$. Then, the transmitting module $5_{13}$ having the non-set address [FFh] and connected next to the transmitting module $5_{12}$ is connected to the central processing controller 1. Accordingly, the transmitting modules $5_2$ and $5_{13}$ in which [FFn] is set in the address setting means are present in the power and communication lines $3a$ and $3b$. For this reason, there would be obstacles against the setting of the logical addresses thereafter.

Third Embodiment

Accordingly, in the third embodiment, the transmitting modules connected after the branch point are set so that they always have different non-set addresses. In addition, this may be realized by controlling the transmitting modules by the central processing controller as follows.

First of all, it is assumed that the transmitting module $5_1$ is connected to the central processing controller 1 by the above-described logical address setting operation. Under such condition, the central processing controller 1 sets the logical address to the branched first transmitting module $5_{12}$ (having the non-set address [00h] as described above). Thereafter, the central processing controller 1 immediately makes the logical address, newly set for the transmitting module $5_{12}$, as the polling address and feeds the opening/closing control command message for opening and controlling the switching element circuit 50.

When the transmitting module $5_{12}$ receives the polling address, its address is set in the address buffer circuit 542. Then, since the logical address has already been set in the address setting means $52_1$, the identical signal is outputted from the address comparator 543 to operate the command identifier 544.

The command message fed from the central processing controller 1 is analyzed by the command identifier 544 of the transmitting module 5 and the command message is identified as the opening/closing control command message for executing the opening control. The opening control signal $S_{CTLO}$ is outputted from the digital output circuit $58_1$ so that the switching element circuit 50 in the transmitting module $5_{12}$ is controlled to be forcibly open.

As described above, the central processing controller 1 controls the transmitting module $5_{12}$ so that it is possible to set the logical address to the transmitting module $5_2$ of the non-set address connected to the power and communication lines $3a$ in the same manner as described above.

Then, even if the branch is again encountered, after the logical address is set in the branched transmitting module, the switching element circuit is controlled to be forcibly open by the switching element circuit opening/closing control command message, it is possible to use the system in the manner of the first embodiment.

If the transmitting module set by the non-set address is not present in the transmitting path, the opening/closing control command message of the switching element circuit is fed to one of the transmitting modules $5_n$ branched and stored in advance in the central processing controller 1.

The transmitting module 5 which has received this command message controls and forcibly closes the switching element circuit 50. The transmitting module which is connected in cascade to the branched module and in which the non-set address [FFh] is set is connected to the central processing controller 1, and the transmitting modules in which the new non-set address is set for every setting operation of the logical address are connected thereto in order. The logical address which should be received by the central processing controller 1 is set so that the transmitting module is designated (in this case, the transmitting module $5_{12}$). Accordingly, it is possible to set the suitable logical address without any duplication.

According to the third embodiment, only by differentiating the non-set addresses of the transmitting modules connected immediately after the branch point from each other in case of the complicate branches, it is possible to set the logical address without fail.

Figure 7A:
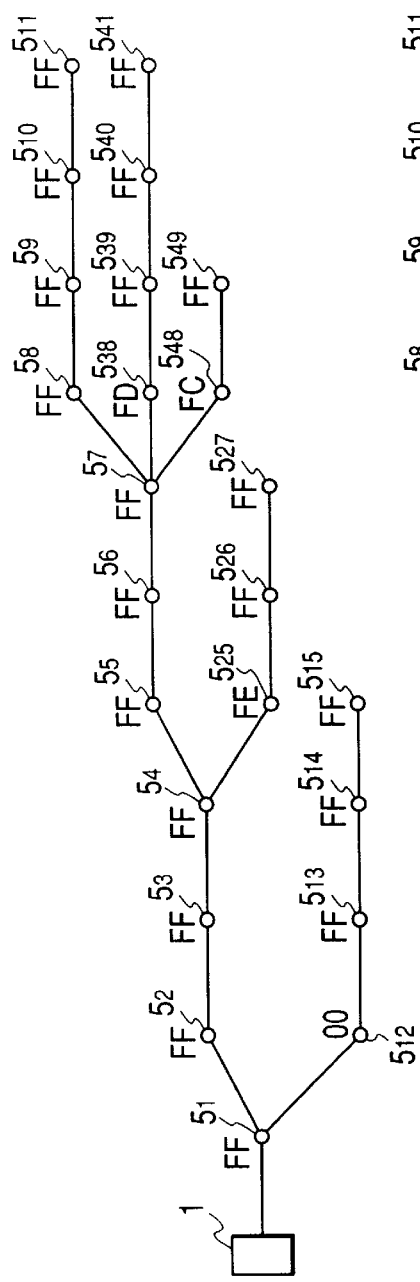
FIG. 7 shows applied examples of the third embodiment in which (a) represents an example in which a unique non-set address is given to every branch point, and (b) represents an example in which a non-set address common to every branch is given.
Figure 7B:
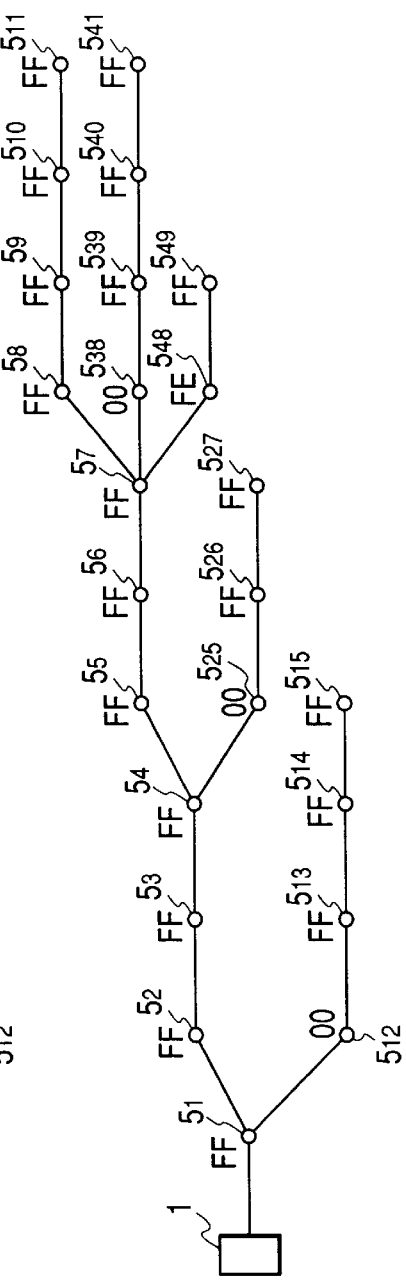

FIG. 7 shows application example of the third embodiment. FIG. 7($a$) shows an applicable example with a unique non-set address for each branch point. FIG. 7($b$) shows an applicable example with a non-set address which is common for each branch point.

In the application example shown in FIG. 7($a$), the transmitting modules $5_1, 5_2, \ldots, 5_{11}, 5_{12}, 5_{13}, \ldots, 5_{15}, 5_{25}, \ldots, 5_{27}, 5_{38}, \ldots, 5_{41}, 5_{48}, 5_{49}$ are connected to the central processing controller 1. The indications of FF, 00, FE, FC and FD are added to the portions of the respective transmitting modules $5_1, 5_2, \ldots, 5_{11}, 5_{12}, 5_{13}, \ldots, 5_{15}, 5_{25}, \ldots, 5_{27}, 5_{38}, \ldots, 5_{41}, 5_{48}, 5_{49}$ in FIG. 7($a$). This means the non-set address given to each transmitting module. [FFh] and [00h] are set in the transmitting modules $5_2$ and $5_{12}$ after the transmitting module $5_1$ at the branch portion. [FFh] and [FEh] are set in the transmitting modules $5_5$ and $5_{25}$ after the transmitting module $5_4$ at the branch portion. [FFh], [FDh] and [FCh] are set in the transmitting modules $5_8$ $5_{38}$ and $5_{48}$ after the transmitting module $5_7$ at the branch portion. A unique address is thus added to every branch point in the application example of FIG. 7($a$).

The application example shown in FIG. 7($b$) has substantially the same structure as that shown in FIG. 7($a$). Accordingly, the same reference codes are used to indicated the corresponding parts of the circuit shown in FIG. 7($a$) and the explanation of the structure will be omitted. The application example of FIG. 7($b$) is different from the application example shown in FIG. 7($a$) in that the non-set address common to each branch is added. Incidentally, in FIG. 7($b$), the indications of FF, 00, and FE are added to the portions of the respective transmitting modules $5_1, 5_2, \ldots, 5_{11}, 5_{12}, 5_{13}, \ldots, 5_{15}, 5_{25}, \ldots, 5_{27}, 5_{38}, \ldots, 5_{41}, 5_{48}, 5_{49}$. These indicate the non-set addresses given to the respective transmitting modules.

For the application examples shown in FIGS. 7($a$) and 7($b$), by the operation in accordance with the third embodiment, it is possible to set the logical addresses for the respective transmitting modules 5.

Namely, in the manner of the above-described third embodiment and the application examples, when the non-set address is set for each transmitting module, the switching element circuit is once controlled to be open by the opening/closing control command message after the logical address is set while assuming that the transmitting module is the module located at the branch point, and immediately the other non-set address is confirmed. Then, if other non-set addresses are present, the setting of the logical address and the opening control of the switching element circuit are carried out in the same steps as described above. Also, if it is confirmed that the other non-set address is no longer present, the switching element circuit of the above-described transmitting module is again returned back to the original condition by the closing control by the opening/closing control command message. The logical address is newly set for the transmitting modules connected after the output terminals of the transmitting module in question.

Figure 8:
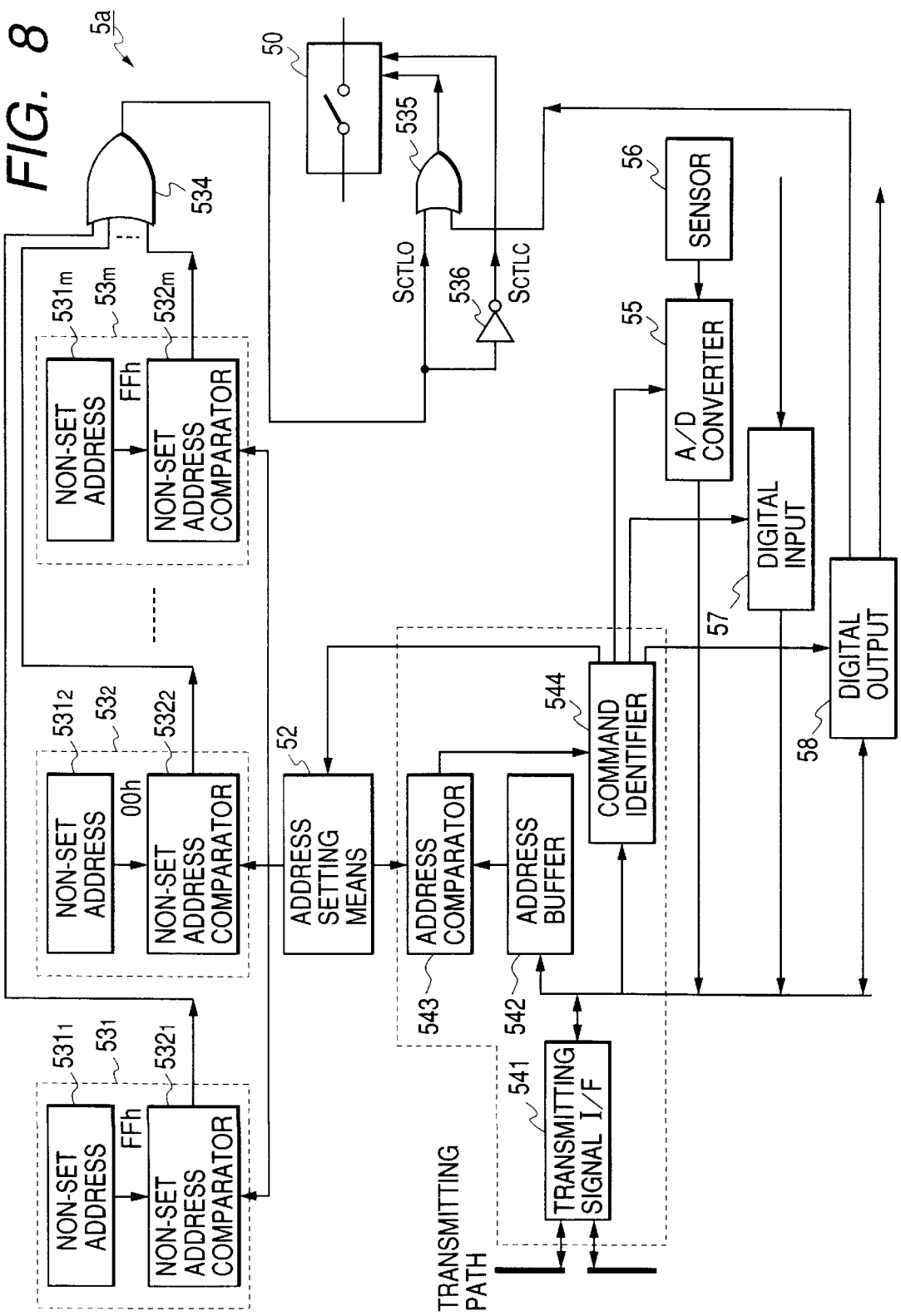
FIG. 8 is a block diagram showing a structural example of a suitable transmitting module for the applied examples of the third embodiment.

FIG. 8 is a block diagram showing another structural example of the transmitting module used in the application example of the manner by the above-described third embodiment. In view of the handling of a plurality (m in number) of non-set addresses, the transmitting module 5a used in the application example in accordance with the third embodiment is constructed as follows.

In FIG. 8, the transmitting module 5a is characterized in that, instead of the non-set address comparator 532 and the non-set address memory 531 in the transmitting module 5 shown in FIG. 2, the non-set address memories $531_1, \ldots, 531m$ and non-set address comparators $532_1, \ldots, 532m$ corresponding to those memories are provided. The other structural components are exactly the same as those provided in the transmitting module shown in FIG. 2. The outputs of the non-set address comparators $532_1, \ldots, 532m$ are connected to the respective input terminals of an OR circuit 534. Also, the output of the OR circuit 534 is connected to an input terminal of an OR circuit 535 and at the same time connected to an input terminal of a reverse circuit 536. The opening control signal by the opening/closing control command of the switching element circuit is inputted into the other input terminal of the OR circuit 535. The output of the OR circuit 353 is connected to the switching element circuit 50. Also, the closing control signal $S_{STLC}$ is outputted from the output of the OR circuit 534.

If the transmitting module 5a is constructed as described above, it is possible to set the different addresses to the non-set address memories $531_1, 531_2 \ldots, 531m$. Accordingly, in FIGS. 7(a) and 7(b), when it is necessary to set the unique non-set address for every branch point or to set an address common to every branch point, it is possible to easily select the necessary non-set address by setting any one of the non-set address memories $531_1, 531_2 \ldots, 531m$ in the address setting means 52 of the transmitting module 5.

The non-set address of the non-set address memory $531x$ (where x is one of 1, 2, . . . , m) selected by the address setting means 52 and the address set in the address setting means 52 are compared with each other in the address comparator $532x$ (where x is one of 1, 2, . . . , m). The identical signal or the non-identical signal is outputted. Since a logic sum of the identical or the non-identical signal is registered by the OR circuit 534, the opening control signal $S_{STLO}$ or the closing control signal $S_{STLC}$ is supplied to the switching element circuit 50 through the OR circuit 535.

These identical and non-identical signals are calculated to obtain a logic sum by the OR circuit 534 to form the opening control signal $S_{CTLO}$. The negative logic value of the opening control signal is taken by the reverse circuit 536 to be used as the closing control signal $S_{CTLC}$. The opening control signal by the opening/closing command message for the switching element circuit outputted from the digital output circuit 58 is given to the switching element circuit 50 through the OR circuit 535.

When the transmitting module 5a is structured as described above, it is possible to easily set the non-set address by setting which one of non-set address memory is set in the address setting means 52.

Fourth Embodiment

Figure 9:
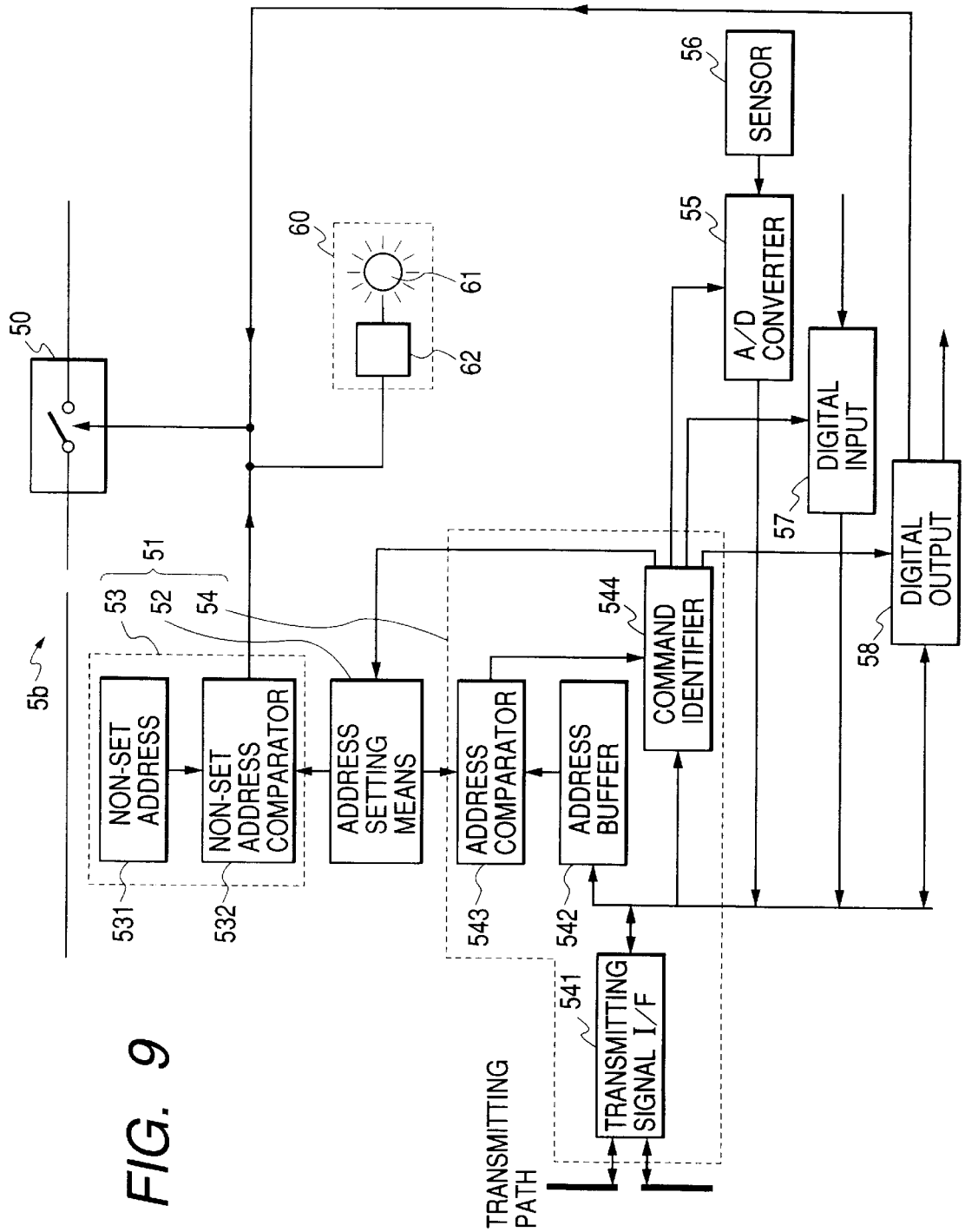
FIG. 9 is a block diagram showing a fourth embodiment.

FIG. 9 is a block diagram showing a fourth embodiment. In FIG. 9, the transmitting module 5b is provided with a display means 60 which is lit under a predetermined condition. The display means 60 is so constructed as to be lit on the basis of the signal of the address non-setting condition from the address detecting means 53.

The above-described display means 60 is composed of, for example, a light emitting diode 61, and a drive circuit 62 for lighting the light emitting diode 61 on the basis of the address non-setting condition signal from the address detecting means 53. Also, the above-described light emitting diode 61 must be disposed so that its lighting portion may be viewed from the outside of the transmitting module 5.

With such circuit structure, when the transmitting module 5 is kept in the condition that it is electrically connected to the central processing controller 1, the address non-setting condition signal is outputted from the non-setting address comparator 532. The address non-set condition signal is inputted to the drive circuit 62. Thus, the drive circuit 62 lights the light emitting diode 61. Accordingly, in the site, the person who should confirm the transmitting module 5 of the address non-setting may know the transmitting module 5 in which the logical address is not set, while watching the light emitting diode 61 of the transmitting module 5 is lit.

In the fourth embodiment in use, the transmitting module 5b is provided with switching element circuit 50, signal processing circuit 51, A/D convertor 55, sensor 56, digital input circuit 57 and digital output circuit 58 in addition to the above-described display means 60.

Also, the signal processing circuit 51 in the above-described transmitting module 5b is provided with address setting means 52, address detecting means 53 and logical address processing means 54.

In this case, the address detecting means 53 constituting the signal processing circuit 51 of the above-described module 5b is provided with the non-set address memory 531 and the non-set address comparator 532.

Figure 10:
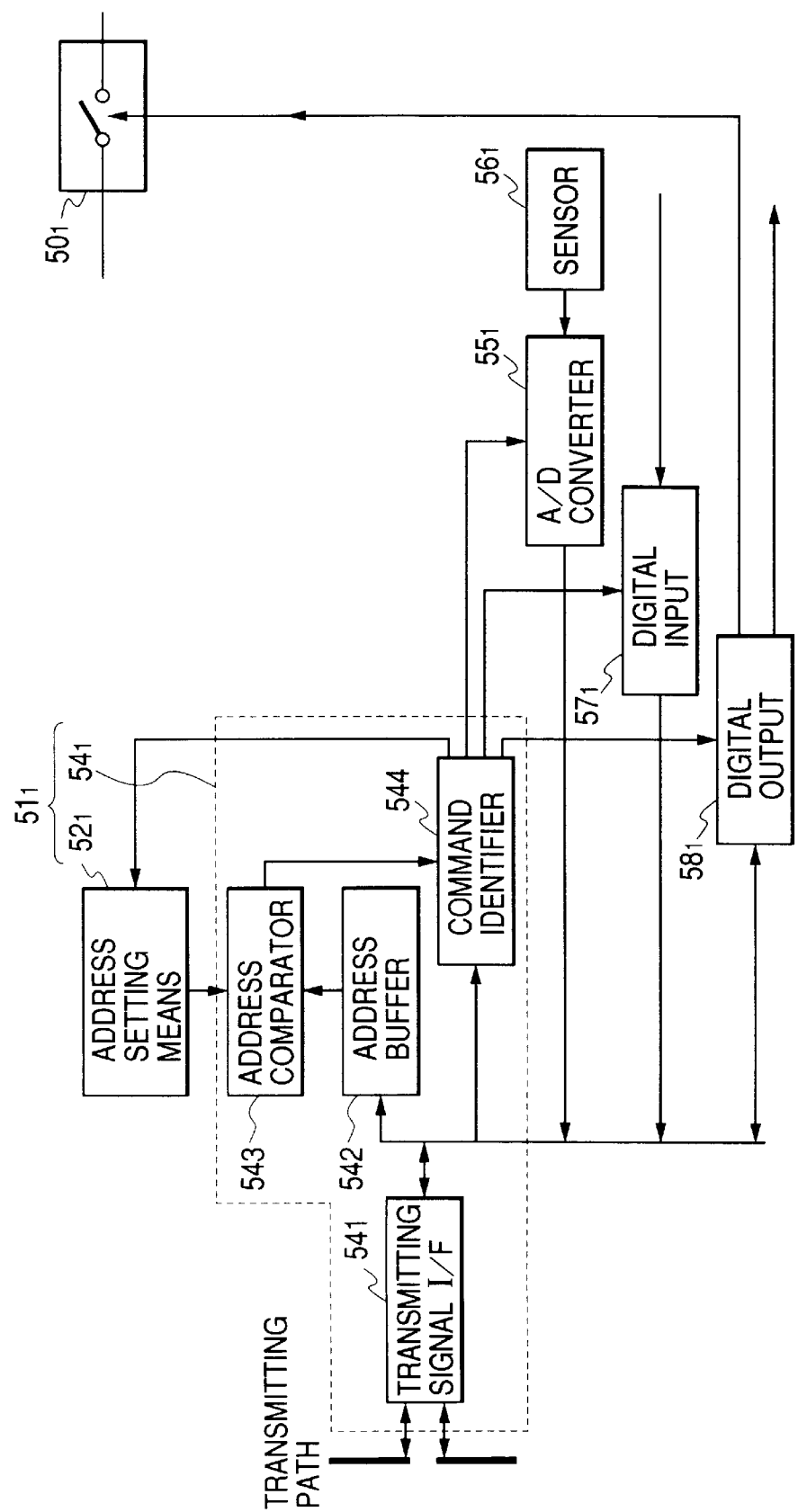
FIG. 10 is a block diagram showing a modification according to the present invention.

FIG. 10 is a block diagram showing the fifth embodiment. The fifth embodiment in FIG. 10 has characteristic, i.e. the first characteristic lies on the side of the central processing controller which transmits the opening/closing control signal of the switching element circuit 50 to the power and communication line 3. The second characteristic lies on the side of the transmitting module 5 which does not include the address detecting means (see the first embodiment) and gives the opening and closing control signal transmitted via the power and communication line 3 to the switching element circuit 50 via the digital output circuit 58 to control opening/closing of the switching element circuit 50.

The structure of the transmitting module 5 in the fifth embodiment will now be explained. In FIG. 10, the transmitting module 5 consists of the signal processing circuit $51_1$, the switching element circuit 50 and other circuits.

The signal processing circuit $51_1$ is provided with the address setting means $52_1$ which can set the predetermined non-set address or the logical address representing the fact that the logical address is not set, and the logical address processing means $54_1$ which set and processes the logical address to the address setting means $52_1$.

Said logical address processing means $54_1$ has a structure which can set an address by the command message for setting the address fed from said power and communication line 3 in said address setting means $52_1$ and which supplies and control a closing control signal to said switching element circuit $50_1$ by the opening/closing control command message fed from said power and communication line 3. This logical address processing means $54_1$ consists, as described in the above, of transmitting signal interface $541_1$, address buffer $542_1$, address comparator $543_1$, command identifer $544_1$ for performing the same process as described in the above.

Other circuit is provided by A/D converter $55_1$, sensor $56_1$, digital input circuit $57_1$ and digital output circuit $58_1$.

In the fifth embodiment, the predetermined non-set address (e.g. FFh) is set in the all address setting means 5 of the transmitting module 5. When the power is supplied in the power and communication line 3, each switching element circuit 50 is kept open thereby the transmitting module 5 which is nearest to this central processing controller is connected in the central processing controller for conducting communication between said central processing controller and said transmitting module.

In order to set the logical address, said central processing controller transmits the command message, then in said transmitting module 5, the non-set address set by the central processing controller in the address buffer 542 and the predetermined non-set address set in advance in the address setting means 52 are compared by the address comparator 543. When comparison identifies agreement, the relevant logical address fed from said central processing controller is set in the address setting means 52.

Then, said central processing controller transmits the logical address set earlier and provides the opening/closing control command message via the power and communication line 3 to said transmitting module 5. Then in said transmitting module 5, the logical address given to the address buffer 542 and the logical address earlier set in the address setting means 52 are compared and confirmed by the address comparator 543 as the opening/closing control command message addressed to themselves. Subsequently the address comparator 543 provides commands to the command identifier 544 and makes the digital output circuit 58 operable. Then the digital output circuit 50 gives the closing control command to the switching element circuit 50 thereby the switching element circuit 50 closes. Resultantly the power and communication line 3 is connected with the subsequent transmitting module 5'.

Thus when the switching element circuit 50 of the transmitting module 5 closes, the transmitting module 5' which is a transmitting module immediately following it operates in setting the logical address etc. based on the predetermined non-set address just like the preceding transmitting module 5. For example, in FIG. 4, suppose that the transmitting module 5 is a transmitting module $5_1$, then the transmitting module 5' immediately following it is a transmitting module $5_2$. As in each of the foregoing embodiments, the logical address can be alloted to all the transmitting module 5 by setting in turn the logical address in the transmitting module 5 and controlling the operation of the transmitting module 5 in which the logical address was earlier set based on this logical address.

Also, the logical address processing means 54 constituting the signal processing circuit 51 of the above-described transmitting module 5b is provided with transmitting signal interface circuit 541, address buffer circuit 542, address comparator 543 and command identifier 544.

In accordance with the thus constructed fourth embodiment, since the light emitting diode 61 is lit when the address is not set, it is possible to readily confirm the non-set address transmitting module 5 at the site.

Others

By the way, it is expensive to provide address detecting means 53 composed of a non-set address memory 531 and the non-address comparator 532 as shown in FIG. 2 for each transmitting module as a hardware. The following modification will now be described with reference to FIG. 10, in which the same function is realized by utilizing the digital output circuit 581.

The address setting function is realized as follows, with the structure shown in FIG. 10 in which the same reference characters are used to indicate the like components or members. First of all, the non-set address FF is set in all the transmitting modules where any logical address is not set. A switching element circuit 501 between the input and output terminals may be opened/closed by the digital output circuit 581 of the transmitting modules, the circuit usually kept open when power is connected. Accordingly, only the transmitting module which is closest to the controller may receive/send the communication signal. Accordingly, it is possible to set a suitable logical address to the closest transmitting module by a command message for setting the address.

Subsequently, the opening/closing control command message is sent to this transmitting module by using the set logical address, and the switching element circuit 501 is controlled to be closed through the digital output circuit 581. Then, it is possible to perform the polling with the transmitting module immediately next to the closest transmitting module and the non-set address (FF). Accordingly, it is possible to shift another logical address in the same method as the above-described method. With such a method, it is possible to allot the logical address to all the transmitting modules.

Namely, in the foregoing embodiments, the opening/closing control signal for closing the switching element circuit 501 is outputted from the non-set address comparator 532 within each transmitting module, whereas, in the modification, since the hardware portion is dispensed with, the opening/closing control signal for closing the switching element circuit 501 is fed from the controller.

Incidentally, in the above-described transmitting system, even when a normal address polling is performed, it is possible to periodically confirm whether or not there is the transmitting module where the logical address is not set by calling the address [FFh], [00h] or the like which is the non-set address.

In the foregoing respective embodiments, the terminals are divided into the input terminals $T_{11}$ and $T_{12}$ and output terminals $T_{21}$ and $T_{22}$ for the sake of convenience. However, since the circuit is symmetrical, it is possible to reverse the terminals like the output terminals $T_{11}$ and $T_{12}$ and the input terminals $T_{21}$ and $T_{22}$. Also, it is possible to provide a single terminal common to the input terminal $T_{12}$ and the output terminal $T_{22}$.

As described above, according to a first aspect of the present invention, the opening control signal is given to the switching element circuit when the non-set address is set in the address setting means, to thereby make open between the input terminal and the output terminal, and the logical address allotted by the command message is set in the address setting means when the polling address of the address set command message from the transmitting path is identical with the non-set address set in the address setting means to thereby close the switching element circuit. Accordingly, the first aspect provides the following effects.

(A) It is possible to automatically allot the logical addresses to transmitting modules such as the sensors or the like connected in casucade to the pair of transmitting paths.

(B) Since only the transmitting module in which the logical address are not allotted open the switching element so that the transmitting module connected thereafter without the set address may not respond, only the module is immediately specified by the controller for communication. It is therefore possible to immediately specify the transmitting module in which the logical address is not set.

(C) If the call is made for the non-set address from the controller and there is some modules corresponding to this call, this means that there is a transmitting module in which the logical address is not set. Accordingly, it is possible to immediately judge whether or not the transmitting module in which the logical address is not set is present.

Also, according to a second aspect of the present invention, it is possible to set a plurality of kinds of non-set addresses in the address setting means of the transmitting modules. Even if the transmitting path is branched from some transmitting module, a different kinds of the non-set address is set in the address setting means of the transmitting module for every branched transmitting path. Accordingly, it is possible to set a logical address on the basis of the non-set address and to set logical addresses in all the transmitting modules connected to the branched transmitting paths.

Also, according to a third aspect of the invention, since it is possible to open and close the switching element circuit after the logical address setting, even if the transmitting path is branched out, it is possible to positively set the logical address in the plurality of transmitting modules belonging to any branch without fail.

Furthermore, according to a fourth aspect of the invention, since the display means is provided and the display means is lit when the logical address is not set, it is possible to immediately judge, from the outside of the transmitting module, whether or not the logical address is set.

According to a fifth aspect of the invention, the non-set address is used and if any address is not set in the transmitting module, it is possible to set the logical address. Accordingly, it ensures the setting operation of the logical address.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A transmitting system including a controller for supervising an address polling system; and a plurality of transmitting modules, connected in cascade to a pair of transmitting paths extending from the controller, for executing polling transmissions from the controller by using a logical address set in each transmitting module; wherein said controller may send a command message for setting the logical address and each transmitting module comprises:

a switching element circuit for opening and closing input and output terminals connected to said transmitting paths; and a signal processing circuit for setting the logical address to an address assigned by the command message when a polling address of the command message is identical to the logical address, and for providing an opening/closing control signal to said switching element circuit depending upon the logical address.

2. A transmitting system according to claim 1 wherein said signal processing circuit includes an address setting means for setting said logical address to a predetermined non-set address, and a logical address processing means for changing the logical address in the address setting means to said address assigned by the command message in order to provide a closing control signal to said switching element circuit from said transmitting path.

3. A transmitting system according to claim 1 wherein each of transmitting modules includes a display means for indicating when an opening control signal is supplied to said switching element circuit.

4. A transmitting system including a controller for supervising an address polling system; and a plurality of transmitting modules, connected in cascade to a pair of transmitting paths extending from the controller, for executing polling transmissions from the controller by using a logical address set in each transmitting module; wherein said controller may send a command message for setting the logical address and each transmitting module comprises:

a switching element circuit having input and output terminals connected to the transmitting paths for opening and closing said input and output terminals in response to an opening/closing control signal; and a signal processing circuit having an address setting means for providing an opening control signal to said switching element circuit when a predetermined non-set address indicates a state in which the logical address is not set in said address setting means, for providing a closing control signal to said switching element circuit when the logical address is set in said address setting means; and for setting the address in said address setting means according to the command message when the polling address of the command message is identical to the address set in said address setting means.

5. The transmitting system according to claim 4, wherein even if the logical address is set in said address setting means, said signal processing circuit provides the opening/closing control signal to said switching element circuit from the command message from the transmitting paths.

6. The transmitting system according to claim 4, wherein each of said transmitting modules includes a display means for indicating when an opening control signal is supplied to said switching element circuit.

7. The transmitting system according to claim 4, wherein said signal processing circuit includes an address setting means for writing a predetermined non-set address or the logical address; and an address detecting means for detecting whether or not the predetermined non-set address is set in said address setting means, for providing the opening control signal to said switching element circuit when the predetermined non-set address is set, and for outputting the closing control signal to said switching element circuit when the logical address is set.

8. A transmitting system including a controller for supervising an address polling system; and a plurality of transmitting modules, connected in cascade to a pair of transmitting paths extending from the controller, for executing polling transmissions from the controller by using a logical address set in each transmitting module; wherein said controller may send a command message for setting the logical address and each transmitting module comprises:

- a switching element circuit having input and output terminals connected to the transmitting paths for opening and closing said input and output terminals in response to an opening/closing control signal;
- a signal processing circuit having an address setting means for providing an opening control signal to said switching element circuit when a predetermined non-set address indicates a state in which a logical address is not set in said address setting means, for providing a closing control signal to said switching element circuit when the logical address is set in said address setting means, and for setting the address in said address setting means according to the command message when the polling address of the command message is identical to the address set in said address setting means; and
- wherein said pair of transmitting paths are branched, a plurality of transmitting modules are connected in cascade in each pair of the branched transmitting paths, and a different predetermined non-set address is set for every branched transmitting path in at least each pair of transmitting modules connected immediately after the branch point of each transmitting path so that a logical address is set for every different predetermined non-set address.

9. The transmitting system according to claim 8, wherein even if the logical address is set in said address setting means, said signal processing circuit provides the opening/closing control signal to said switching element circuit from the command message from the transmitting paths.

10. The transmitting system according to claim 8, wherein each of said transmitting modules includes a display means for indicating when a opening control signal is provided to said switching element circuit.

11. The transmitting system according to claim 8, wherein said signal processing circuit includes

- an address setting means for writing a predetermined non-set address or the logical address; and
- an address detecting means for detecting whether or not the predetermined non-set address is set in said address setting means, for providing the opening control signal to said switching element circuit when the predetermined non-set address is set, and for outputting the closing control signal to said switching element circuit when the logical address is set.

* * * * *